(12) United States Patent
Kurokawa et al.

(10) Patent No.: US 8,598,265 B2
(45) Date of Patent: *Dec. 3, 2013

(54) THERMOPLASTIC ELASTOMER COMPOSITION

(75) Inventors: Ryosuke Kurokawa, Ichihara (JP);
Nobuhiro Natsuyama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/597,931

(22) Filed: Aug. 29, 2012

(65) Prior Publication Data

US 2013/0059978 A1    Mar. 7, 2013

(30) Foreign Application Priority Data

Sep. 2, 2011 (JP) ................................. 2011-191475

(51) Int. Cl.
| | |
|---|---|
| *C09B 67/00* | (2006.01) |
| *C08F 8/00* | (2006.01) |
| *C08L 23/00* | (2006.01) |
| *C08L 23/04* | (2006.01) |
| *C08L 23/10* | (2006.01) |
| *C08L 33/02* | (2006.01) |
| *C08L 33/04* | (2006.01) |
| *C08L 35/02* | (2006.01) |

(52) U.S. Cl.
USPC ........... 524/502; 525/191; 525/221; 525/222; 525/240

(58) Field of Classification Search
USPC ................... 524/502; 525/191, 221, 222, 240
See application file for complete search history.

(56) References Cited

U.S. PATENT DOCUMENTS

| | | | |
|---|---|---|---|
| 2010/0016495 A1* | 1/2010 | Taniguchi | ..................... 524/502 |
| 2010/0261846 A1 | 10/2010 | Shimano et al. | |
| 2013/0059977 A1* | 3/2013 | Kurokawa et al. | ............ 525/190 |

FOREIGN PATENT DOCUMENTS

| | | |
|---|---|---|
| JP | 06-136205 A | 5/1994 |
| JP | 2005-320409 A | 11/2005 |
| WO | 2008026632 A1 | 3/2008 |

* cited by examiner

*Primary Examiner* — Nathan M Nutter
(74) *Attorney, Agent, or Firm* — Panitch Schwarze Belisario & Nadel LLP

(57) ABSTRACT

Disclosed is a thermoplastic elastomer composition that will provide little load on the environment and has superior mechanical characteristics, the composition being obtained by melt-kneading 10 to 90 parts of ethylene-α-olefin based copolymer rubber (A), 1 to 50 parts of non-petroleum source-derived thermoplastic resin (B), 1 to 50 parts of modified propylene-based copolymer (C), 1 to 50 parts of propylene-based polymer (D), 0.001 to 5 parts of crosslinking agent (E), and 0 to 50 parts of mineral oil-based softening agent (F), wherein the amounts of components (A), (B), (C), (D), and (F) are amounts in weight calculated where the combined amount of components (A), (B), (C), (D) and (F) is considered to be 100 parts by weight, and the amount of component (E) is an amount in weight calculated where the combined amount of components (A), (B), (C), (D), and (F) is considered to be 100 parts by weight.

4 Claims, No Drawings

THERMOPLASTIC ELASTOMER COMPOSITION

BACKGROUND OF THE INVENTION

The present invention relates to a thermoplastic elastomer composition that will provide little load on the environment and to a method for producing the same.

Olefin-based thermoplastic elastomer compositions have been used for various components typified by automotive interior parts, such as console boxes and instrument panel overcoatings, and automotive exterior parts, such as window moldings because they can be processed by means of molding machines in use for ordinary thermoplastic resins and they are recyclable and flexible (see JP-A-6-136205).

On the other hand, the environmental pollution caused by the dumping of plastics and the global warming caused by the gas emitted at the time of the incineration of plastics have recently become problems. Under such situations, for example, polylactic acid obtainable by polymerizing lactic acid produced by fermenting starch or the like has attracted attention as a biodegradable plastic or a carbon-neutral material.

However, since only low impact resistance can be achieved by a polylactic acid alone under the present circumstances, it is difficult to substitute for conventional petroleum source-derived resins. In order to impart impact resistance to a polylactic acid-based polymer, a method that comprises adding a rubber (see WO 2008/026632 A) and a method that comprises adding a thermoplastic resin and a graft copolymer (see JP-A-2005-320409) have been proposed.

There have heretofore been developed various environmentally friendly plastics using non-petroleum source-derived materials. Many of such plastics, however, are inferior in mechanical characteristic, rubber elasticity, and the like and therefore their field of application has been limited.

BRIEF SUMMARY OF THE INVENTION

Under such circumstances, the problem to be solved by the present invention is to provide a thermoplastic elastomer composition that will provide little load on the environment and has superior mechanical characteristics.

The present invention relates to a thermoplastic elastomer composition obtained by melt-kneading 10 to 90 parts by weight of an ethylene-α-olefin based copolymer rubber (A), 1 to 50 parts by weight of a non-petroleum source-derived thermoplastic resin (B), 1 to 50 parts by weight of a modified propylene-based copolymer (C), 1 to 50 parts by weight of a propylene-based polymer (D), 0.001 to 5 parts by weight of a crosslinking agent (E), and 0 to 50 parts by weight of a mineral oil-based softening agent (F), wherein the amounts of the components (A), (B), (C), (D), and (F) added are amounts calculated where the combined amount of the components (A), (B), (C), (D), and (F) added is considered to be 100 parts by weight, and the amount of the component (E) added is an amount calculated where the combined amount of the components (A), (B), (C), (D), and (F) added is considered to be 100 parts by weight.

By the present invention, it is possible to provide a thermoplastic elastomer composition that will provide little load on the environment and has superior mechanical characteristics.

DETAILED DESCRIPTION OF THE INVENTION (Component (A))

Component (A) is an ethylene-α-olefin-based copolymer rubber. The component (A) is a copolymer having constitutional units derived from ethylene (namely, ethylene units) and constitutional units derived from an α-olefin having 3 to 10 carbon atoms (namely, units of an α-olefin having 3 to 10 carbon atoms). Examples of the α-olefin having 3 to 10 carbon atoms include propylene, 1-butene, 2-methylpropylene, 1-pentene, 3-methyl-1-butene, 1-hexene, 4-methyl-1-pentene, and 1-octene; one or more species out of these olefins are used. Propylene and 1-butene are preferred as the α-olefin having 3 to 10 carbon atoms, and propylene is more preferred.

The component (A) may have, in addition to ethylene units and units of such an α-olefin having 3 to 10 carbon atoms, constitutional units based on another monomer. Examples of such another monomer include conjugated dienes having 4 to 8 carbon atoms such as 1,3-butadiene, 2-methyl-1,3-butadiene (namely, isoprene), 1,3-pentadiene, and 2,3-dimethyl-1,3-butadiene; nonconjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl ester compounds such as vinyl acetate; unsaturated carboxylic acid esters, such as methyl acrylate, ethyl acrylate, butyl acrylate, methyl methacrylate, and ethyl methacrylate; and unsaturated carboxylic acids, such as acrylic acid and methacrylic acid; one or more species of these monomers are used. 5-Ethylidene-2-norbornene and dicyclopentadiene are preferred.

The content of the ethylene units of the component (A) is usually 30 to 90 parts by weight, preferably 40 to 80 parts by weight; the content of the α-olefin units having 3 to 10 carbon atoms is usually 10 to 70 parts by weight, preferably 20 to 60 parts by weight; and the content of constitutional units other than the ethylene units and the α-olefin units is usually 0 to 30 parts by weight, preferably 0 to 20 parts by weight. The overall amount of the constitutional units in the ethylene-α-olefin-based copolymer rubber is considered to be 100 parts by weight.

Examples of the component (A) include ethylene-propylene copolymer rubbers, ethylene-1-butene copolymer rubbers, ethylene-1-hexene copolymer rubbers, ethylene-1-octene copolymer rubbers, ethylene-propylene-1-butene copolymer rubbers, ethylene-propylene-1-hexene copolymer rubbers, ethylene-propylene-1-octene copolymer rubbers, ethylene-propylene-5-ethylidene-2-norbornene copolymer rubbers, ethylene-propylene-dicyclopentadiene copolymer rubbers, ethylene-propylene-1,4-hexadiene copolymer rubbers, and ethylene-propylene-5-vinyl-2-norbornene copolymer rubbers. These are used singly or in combination. Preferred are ethylene-propylene copolymers or ethylene-propylene-5-ethylidene-2-norbornene copolymers having a content of ethylene units of 40 to 80 parts by weight, a content of propylene units of 20 to 60 parts by weight, and a content of 5-ethylidene-2-norbornene units of 0 to 20 parts by weight.

The Mooney viscosity ($ML_{1+4}100°$ C.) of the component (A) is preferably 5 to 300, more preferably 10 to 200. If the Mooney viscosity is excessively low, the tensile characteristics of the thermoplastic elastomer composition may deteriorate, whereas if the Mooney viscosity is excessively high, the appearance of a molded article may be damaged. The Mooney viscosity ($ML_{1+4}100°$ C.) is measured in accordance with JIS K6300.

The intrinsic viscosity of the component (A) measured in 135° C. tetralin is preferably 0.5 dl/g to 8 dl/g, and more preferably 1 dl/g to 6 dl/g. If the intrinsic viscosity is excessively low, the tensile characteristics of the thermoplastic elastomer composition may deteriorate, whereas if the intrinsic viscosity is excessively high, the appearance of a molded article may be damaged.

(Component (B))

Component (B) is a non-petroleum source-derived thermoplastic resin, which is a thermoplastic resin produced by polymerizing monomers primarily containing monomers obtained from plant sources or animal sources or monomers obtained by enzymatic decomposition, fermentation, or modification from plant sources.

Specific examples include polyester-based polymers composed of aliphatic hydroxycarboxylic acids, polyester-based polymers composed of aliphatic diols and aliphatic dicarboxylic acids, and biomass-derived materials such as cellulose acetate, starch resin, and bio-polyethylene; preferred are polyester-based polymers composed of aliphatic hydroxycarboxylic acids and polyester-based polymers composed of aliphatic diols and aliphatic dicarboxylic acids.

More specific examples are polylactic acid, polyglycolic acid, poly(3-hydroxybutyric acid), poly(4-hydroxybutyric acid), poly(4-hydroxyvaleric acid), polycaprolactone, polyester carbonate, polyethylene succinate, polybutylene succinate, polyhexamethylene succinate, polyethylene adipate, polybutylene adipate, polyhexamethylene adipate, polybutylene succinate adipate, polyethylene oxalate, polybutylene oxalate, polyhexamethylene oxalate, polyethylene sebacate, and polybutylene sebacate. These are used singly or two or more of them are used in combination.

Among these, the use of a poly($\alpha$-hydroxy acid) such as polylactic acid and polyglycolic acid is preferred, and polylactic acid is particularly preferred because it has a relatively high melting point, high transparency, and high rigidity and it is superior in processability.

The polylactic acid to be used for the present invention is a resin of a polymer composed only of constitutional units derived from L-lactic acid and/or D-lactic acid, a resin of a copolymer composed of constitutional units derived from L-lactic acid and/or D-lactic acid and constitutional units derived from monomers other than L-lactic acid and D-lactic acid, or a resin of a mixture of a polymer composed only of constitutional units derived from L-lactic acid and/or D-lactic acid and a copolymer composed of constitutional units derived from L-lactic acid and/or D-lactic acid and constitutional units derived from a monomer other than L-lactic acid and D-lactic acid.

Examples of the monomer other than L-lactic acid and D-lactic acid include hydroxycarboxylic acids, such as glycolic acid, aliphatic polyhydric alcohols, such as butanediol, and aliphatic polycarboxylic acids, such as succinic acid. The polylactic acid can be produced by, for example, a method comprising dehydration polycondensing lactic acid (L-lactic acid, D-lactic acid, or a mixture of L-lactic acid and D-lactic acid) and, according to necessity, other monomers, a method comprising ring-opening polymerizing a cyclic dimer of lactic acid (namely, lactide), a method comprising ring-opening polymerizing lactide and a cyclic bimolecular condensate of lactic acid with a hydroxycarboxylic acid other than lactic acid, or a method comprising ring-opening polymerizing lactide and/or a cyclic bimolecular condensate of lactic acid with a hydroxycarboxylic acid other than lactic acid, and, according to necessity, a cyclic dimer of a hydroxycarboxylic acid other than lactic acid (e.g., glycolide) or a cyclic ester derived from a hydroxycarboxylic acid (e.g., $\epsilon$-caprolactone).

From the viewpoint of enhancing the heat resistance of a thermoplastic elastomer composition, the content of the constitutional units derived from L-lactic acid or D-lactic acid contained in polylactic acid segments in the polylactic acid is preferably not less than 80 mol %, and more preferably not less than 90 mol % more, and even more preferably not less than 95 mol %. The weight average molecular weight (Mw) of the polylactic acid is preferably 10,000 to 1,000,000, more preferably 50,000 to 500,000. The molecular weight distribution (Q value, Mw/Mn) is preferably from 1 to 4. Molecular weight and molecular weight distribution are measured by gel permeation chromatography (GPC) using standard polystyrenes as molecular weight standards.

(Component (C))

Component (C) is a modified propylene-based copolymer, and preferably a modified propylene-based copolymer having a reactive functional group capable of reacting with component (B). Examples of a propylene-based polymer to be modified include propylene homopolymers, propylene-based random copolymers, and propylene-based block copolymers. As to the propylene-based polymer to be modified, these polymers may be used singly or two or more of them may be used in combination. The propylene-based polymer to be used for the component (C) may be either the same as or different from the below-described propylene-based polymer (component (D)) to be used in the present invention.

Examples of the propylene-based random copolymer or the propylene-based block copolymer include random copolymers or block copolymers of propylene-ethylene copolymers, propylene-1-butene copolymers, propylene-ethylene-1-butene copolymers, propylene-1-hexene copolymers, propylene-1-octene copolymers, propylene-ethylene-1-hexene copolymers, and the like. More preferred as the propylene-based polymer are propylene homopolymers, propylene-ethylene copolymers, propylene-1-butene copolymers, and propylene-ethylene-1-butene copolymers. These polymers may be used singly or two or more of them may be used in combination.

Specific examples of the modified propylene-based copolymer include those having a carboxyl group, a carboxylic anhydride group, a carboxylic acid ester group, a hydroxy group, an epoxy group, an amide group, an ammonium group, a nitrile group, a cyano group, an amino group, an imido group, an isocyanate group, an acetyl group, a thiol group, an ether group, a thioether group, a sulfone group, a phosphono group, a nitro group, a urethane group, a halogen atom, or the like. As to such functional groups, the modified propylene-based copolymer may have two or more functional groups.

Among these, modified propylene-based copolymers having a functional group capable of reacting with component (B), i.e., a carboxyl group, a carboxylic acid anhydride group, a carboxylic acid ester group, an epoxy group, an amide group, or an ammonium group are preferred, and a modified propylene-based copolymer containing constitutional units derived from an unsaturated carboxylic acid and/or constitutional units derived from an unsaturated carboxylic acid derivative (C-1) and a modified propylene-based copolymer containing constitutional units derived from an $\alpha,\beta$-unsaturated glycidyl ester and/or constitutional units derived from an $\alpha,\beta$-unsaturated glycidyl ether (C-2) are more preferred.

Examples of the unsaturated carboxylic acid include maleic acid, fumaric acid, itaconic acid, acrylic acid, and methacrylic acid. Examples of the unsaturated carboxylic acid derivative include anhydrides, ester compounds, amide compounds, imide compounds, and metal salts of unsaturated carboxylic acids. Specific examples of the unsaturated carboxylic acid derivatives include maleic anhydride, itaconic anhydride, methyl acrylate, ethyl acrylate, butyl acrylate, methyl methacrylate, ethyl methacrylate, butyl methacrylate, 2-hydroxyethyl methacrylate, monoethyl maleate, diethyl maleate, monomethyl fumarate, dimethyl fumarate, acrylamide, methacrylamide, maleic acid monoamide, maleic acid diamide, fumaric acid monoamide, maleimide, N-butylmaleimid, and sodium methacrylate. Among these, as to the unsaturated carboxylic acid, the use of maleic acid or acrylic acid is preferred, and as to the unsaturated carboxylic acid derivative, the use of maleic anhydride or 2-hydroxyethyl methacrylate is preferred.

The content of the constitutional units derived from an unsaturated carboxylic acid and/or the constitutional units derived from an unsaturated carboxylic acid derivative is preferably 0.01 to 20 parts by weight, more preferably 0.1 to 5 parts by weight, and even more preferably 0.3 to 2 parts by weight. The content of all the constitutional units in the modified propylene-based copolymer is considered to be 100 parts by weight. The content of the constitutional units derived from an unsaturated carboxylic acid and/or the constitutional units derived from an unsaturated carboxylic acid derivative is measured by infrared spectroscopy.

The melt flow rate (MFR) of the component (C-1) is 0.1 g/10 min to 300 g/10 min, and preferably 0.5 g/10 min to 150 g/10 min. Here, the melt flow rate is a value measured at a test temperature of 230° C. and a test load of 21.18 N in accordance with JIS K 7210 (1995).

Examples of the above-mentioned α,β-unsaturated glycidyl ester include glycidyl methacrylate and glycidyl acrylate. Examples of the above-mentioned α,β-unsaturated glycidyl ether include allyl glycidyl ether and 2-methylallyl glycidyl ether, and preferred is glycidyl methacrylate.

The content of the constitutional units derived from an α,β-unsaturated glycidyl ester and/or the constitutional units derived from an α,β-unsaturated glycidyl ether is preferably 0.01 to 20 parts by weight, more preferably 0.1 to 5 parts by weight, and even more preferably 0.6 to 2 parts by weight. The content of all the constitutional units in the modified propylene-based copolymer is considered to be 100 parts by weight. The content of the constitutional units derived from an α,β-unsaturated glycidyl ester is measured by infrared spectroscopy.

The melt flow rate (MFR) of the component (C-2) is 0.1 g/10 min to 300 g/10 min, preferably 0.5 g/10 min to 100 g/10 min, and more preferably 1 g/10 min to 50 g/10 min. Here, the melt flow rate is a value measured at a test temperature of 230° C. and a test load of 21.18 N in accordance with JIS K 7210 (1995).

An example of the methods for producing the components (C-1) and (C-2) is a method in which a propylene-based polymer and an α,β-unsaturated glycidyl ester and the like are melt-kneaded by using a mixer, an extruder, or the like.

Comparing the component (C-1) with the component (C-2), the use of the component (C-2) is preferred from the viewpoint of the reactivity with a non-petroleum source-derived thermoplastic resin.

The modified propylene-based copolymer may be either one having a functional group in the main chain of a propylene-based copolymer or one having a functional group as a side chain on the main chain of a propylene-based copolymer.

(Component (D))

Component (D) is a propylene homopolymer, a propylene-based random copolymer, a propylene-based block copolymer, or the like. As the component (D), these polymers may be used singly or at least two polymers may be used in combination.

In order to enhance the heat resistance of a thermoplastic elastomer composition, the above-mentioned propylene-based random copolymer is preferably (1) a propylene-ethylene random copolymer having a content of propylene units of 90 to 99.5 parts by weight and a content of ethylene units of 0.5 to 10 parts by weight (the sum total of the contents of the propylene units and the ethylene units is considered to be 100 parts by weight); (2) a propylene-ethylene-α-olefin random copolymer having a content of propylene units of 90 to 99 parts by weight, a content of ethylene units of 0.5 to 9.5 parts by weight, and a content of units of an α-olefin having 4 to 10 carbon atoms of 0.5 to 9.5 parts by weight (the sum total of the contents of the propylene units, the ethylene units, and the α-olefin units is considered to be 100 parts by weight); or (3) a propylene-α-olefin random copolymer having a content of propylene units of 90 to 99.5 parts by weight and a content of units of an α-olefin having 4 to 10 carbon atoms of 0.5 to 10 parts by weight (the sum total of the contents of the propylene units and the α-olefin units is considered to be 100 parts by weight).

The above-mentioned propylene-based block copolymer is a mixture composed of a first polymer and a second polymer produced by a production method composed of step (1) of producing the first polymer, which is a homopolymer of propylene or a random copolymer composed of propylene and ethylene and/or an α-olefin, and step (2) of producing, in the presence of the first polymer, the second polymer, which is a random copolymer of propylene and ethylene and/or an α-olefin, wherein the content of constitutional units other than propylene units contained in the second polymer (namely, the content of ethylene units, the content of α-olefin units, or the combined content of ethylene units and α-olefin units) is larger than the content of constitutional units other than propylene units contained in the first polymer.

In order to enhance the heat resistance of a thermoplastic elastomer composition, the block copolymer is preferably a polymer in which the content of constitutional units other than propylene units contained in the first polymer is 0 to 10 parts by weight (the overall content of all the constitutional units contained in the first polymer is considered to be 100 parts by weight), more desirably a copolymer in which the content of constitutional units other than propylene units contained in the second polymer is 5 to 50 parts by weight (the overall content of all the constitutional units contained in the second polymer is considered to be 100 parts by weight), and even more desirably a copolymer in which the content of the second polymer is 5 to 70 parts by weight (the quantity of the block copolymer is considered to be 100 parts by weight).

Examples of the above-mentioned α-olefin having 4 to 10 carbon atoms include linear α-olefins such as 1-butene, 1-pentene, 1-hexene, 1-octene, and 1-decene; branched α-olefins such as 3-methyl-1-butene and 3-methyl-1-pentene; and combinations of two or more of them.

In order to improve the processability of a thermoplastic elastomer composition, the melt flow rate (MFR) of the component (D) measured at 230° C. under a load of 21.18 N in accordance with JIS K7210 is 0.1 to 150 g/10 min, and more preferably 0.1 to 100 g/10 min. If there is too much component (D), the strength and the permanent compression set resistance of the thermoplastic elastomer composition may deteriorate, whereas if there is too little component (D), the processability of the thermoplastic elastomer composition may deteriorate. The ratio of the component (C) to the component (D) is preferably from 20/80 to 80/20, and more preferably from 40/60 to 60/40.

Examples of the component (D) include propylene homopolymers, ethylene-propylene random copolymers, ethylene-propylene-butene random copolymers, ethylene-propylene block copolymers, and ethylene-propylene-butene block copolymers. Especially, propylene homopolymers, ethylene-propylene random copolymers, and ethylene-propylene block copolymers are preferred.

An example of the method for producing the propylene-based polymer of the component (D) is a method that comprises homopolymerizing propylene or copolymerizing propylene and other monomers by a conventional polymerization technique, such as slurry polymerization, solution polymerization, bulk polymerization, and vapor phase polymerization, using a conventional Ziegler-Natta catalyst or a conventional complex-based catalyst, such as a metallocene type complex and a non-metallocene type complex.

(Component (E))

Any crosslinking agent having heretofore been used can be used as a crosslinking agent of component (E). Examples of such a crosslinking agent include organic peroxides, sulfur compounds, and alkylphenol resins. Especially, organic peroxides are preferred.

Examples of such organic peroxides include ketone peroxides, diacyl peroxides, hydroperoxides, dialkyl peroxides, peroxyketals, alkyl peresters, percarbonates, peroxydicarbonates, and peroxyesters. Examples of specific organic peroxides include dicumyl peroxide, 2,5-dimethyl-2,5-di-(tert-butylperoxy) hexane, 2,5-dimethyl-2,5-di(tert-butylperoxy) hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene peroxide, tert-butyl peroxide, 1,1-di-tert-butylperoxy-3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, p-chlorobenzoyl peroxide; and combination of two or more of these organic peroxides.

The amount of the component (E) added is 0.001 to 5 parts by weight, preferably 0.05 to 2 parts by weight, and more preferably 0.1 to 1 part by weight where the sum total of the contents of the components (A), (B), (C), and (D) is considered to be 100 parts by weight. If there is too much component (E), the processability of the thermoplastic elastomer composition may deteriorate, whereas if there is too little component (E), the strength and the permanent compression set resistance of the thermoplastic elastomer composition may deteriorate.

In order to improve the degree of crosslinking of the thermoplastic elastomer composition to be produced, the component (E) may be combined with a crosslinking aid. Preferable crosslinking aids are compounds having two or more double bonds. Examples of such crosslinking aids include peroxide crosslinking aids, such as N,N-m-phenylenebismaleimide, toluoylene bismaleimide, p-quinonedioxime, nitrosobenzene, diphenylguanidine, and trimethylolpropane; and polyfunctional vinyl monomers, such as divinylbenzene, triallyl cyanurate, triallyl isocyanurate, ethylene glycol dimethacrylate, polyethylene glycol dimethacrylate, trimethylolpropane trimethacrylate, and allyl methacrylate. Especially, trimethylolpropane trimethacrylate is preferred.

The amount of the crosslinking aid is 0.01 to 10 parts by weight, and preferably 0.01 to 5 parts by weight where the combined amount of the components (A), (B), (C), and (D) is considered to be 100 parts by weight.

(Component (F))

Component (F) is a mineral oil-based softening agent, examples of which include high-boiling fractions of petroleum (with an average molecular weight of 300 to 1500 and a pour point of 0° C. or lower), such as aromatic mineral oil, naphthenic mineral oil, and paraffinic mineral oil. Among these, paraffinic mineral oil is preferred.

The mineral oil-based softening agent to be used for the component (F) may be blended as an extending oil into the component (A). When the component (A) is an oil extended rubber, the content of the mineral oil-based softening agent in the component (A) is preferably 10 to 200 parts by weight, more preferably 20 to 150 parts by weight, and even more preferably 40 to 120 parts by weight where the amount of the rubber component is considered to be 100 parts by weight. If there is too much mineral oil-based softening agent, the strength of the thermoplastic elastomer composition may deteriorate, whereas if there is too little mineral oil-based softening agent, the processability and the permanent compression set resistance of the thermoplastic elastomer composition may deteriorate.

Examples of the method for blending a mineral oil-based softening agent with the component (A) include a method comprising mechanically kneading a copolymer rubber and a mineral oil by using a kneading apparatus such as a roll and a Banbury mixer, and a method comprising adding a prescribed amount of mineral oil to a copolymer rubber solution and then removing the solvent by steam stripping or the like.

The added amounts of the components (A), (B), (C), (D), and (F) to be used for the thermoplastic elastomer composition of the present invention are 10 to 90 parts by weight for the component (A), 1 to 50 parts by weight for the component (B), 1 to 50 parts by weight for the component (C), 1 to 50 parts by weight for the component (D), and 0 to 50 parts by weight of the component (F), where the combined amount of these five components is adjusted to 100 parts by weight. Moreover, from the viewpoint of the softness, the permanent compression set resistance, and the processability of molded articles obtained from the thermoplastic elastomer composition of the present invention, preferably, the amount of the component (A) added is 30 to 80 parts by weight, the amount of the component (B) added is 10 to 50 parts by weight, the amount of the component (C) added is 5 to 40 parts by weight, the amount of the component (D) added is 5 to 40 parts by weight, and the amount of the component (F) added is 0 to 40 parts by weight. More preferably, the amount of the component (A) added is 40 to 80 parts by weight, the amount of the component (B) added is 10 to 45 parts by weight, the amount of the component (C) added is 5 to 30 parts by weight, the amount of the component (D) added is 10 to 40 parts by weight, and the amount of the component (F) added is 0 to 40 parts by weight.

In the present invention, in addition to the aforementioned components (A) through (F), other additional components may be added according to necessity unless the purpose of the present invention is impaired. As such additional components, there can be contained additives such as inorganic fillers (e.g., talc, calcium carbonate, and calcined kaolin), organic fillers (e.g., fiber, wood flour, and cellulose powder), antioxidants (e.g., phenol-based, sulfur-based, phosphorus-based, lactone-based, and vitamin-based antioxidants), weathering stabilizers, UV absorbers (e.g., benzotriazole-based, triazine-based, anilide-based, and benzophenone-based UV absorbers), heat stabilizers, light stabilizers (e.g., hindered amine type light stabilizers and benzoate type light stabilizers), antistatic agents, nucleating agents, pigments, adsorbents (e.g., metal oxides such as zinc oxide and magnesium oxide), metal chlorides (e.g., ferric chloride and calcium chloride), hydrotalcite, aluminates, lubricants (e.g., fatty acids, higher alcohols, aliphatic amides, and aliphatic esters) and silicone compounds. Such additives may be blended in advance into one or more of the components (A), (B), (C), and (D), followed by the preparation of a thermoplastic elastomer composition or they may be blended after or during the melt-kneading of the components (A), (B), (C), (D), (E), and (F).

As to the morphology of the thermoplastic elastomer composition observed with a transmission electron microscope, the morphology preferably has a phase form in which the components (C) and (D) form a continuous phase, and the components (A) and (B) are dispersed in the continuous phase.

In such a situation, the average particle diameter of the dispersed phase made of the component (A) is preferably 0.01 to 20 more preferably 0.01 to 10 and even more preferably 0.01 to 5 μm.

Moreover, the average particle diameter of the dispersed phase made of the component (B) is preferably 0.01 to 10 more preferably 0.01 to 5 and even more preferably 0.01 to 2

The phase form of the thermoplastic elastomer composition of the present invention and the average particle diameter of the dispersed phase of the components (A) and (B) can be determined from a transmission electron microscope photograph taken by ultrathin sectioning. When observing the thermoplastic elastomer composition of the present invention with a transmission electron microscope, the thermoplastic elastomer composition is processed into a thin section with a freezing microtome first and then this is stained using a coloring agent, such as ruthenium tetraoxide, osmium tetraoxide, chlorosulfonic acid, uranyl acetate, tungstophosphoric acid, iodine ion, and trifluoroacetic acid.

In selecting such a coloring agent, it is necessary to select an optimum coloring agent according to the types of the components (A), (B), (C), (D), and (F) contained in the thermoplastic elastomer composition to be observed.

The average particle diameter of the dispersed phase of the components (A) and (B) is obtained by calculating, by the method described below, the diameter of each of 100 particles of the components (A) and (B) found in a transmission electron microscope photograph of the obtained thermoplastic elastomer composition taken by an ultrathin sectioning method, and then calculating the average of the calculated diameters of the particles. As to the particle diameter of each particle, the area S of each particle is measured and then $(4S/\pi)^{0.5}$ is defined to be the particle diameter of each particle. Even if there are particles of 0.01 to 20 μm, if they have agglomerated and are in contact with each other, the agglomerated particle is treated as one particle.

As the melt-kneading apparatus to be used for obtaining the thermoplastic elastomer composition of the present invention, there can be used conventional apparatuses such as a mixing roll, which is of an open type, a Banbury mixer, an extruder, a kneader, and a continuous mixer, which are of a non-open type. Among these, the use of a non-open type apparatus is preferred. In the melt-kneading, it is permitted to melt-knead at once all components to be kneaded, or it is permitted to knead some components and then add remaining components, followed by melt-kneading. The melt-kneading may be carried out either once or twice or more.

The melt-kneading temperature is preferably 150 to 300° C., and more preferably 180 to 250° C. The melt-kneading time is usually 1 to 30 minutes. If the melt-kneading temperature is excessively high, the component (B) is decomposed, resulting in a tendency that the component (B) aggregates and, as a result, the particle diameter becomes larger, whereas if the melt-kneading temperature is excessively low, the components (B), (C), and (D) are not melted sufficiently and therefore they are not kneaded sufficiently, resulting in a tendency that the particle diameter of the component (B) becomes larger.

The phase form in the thermoplastic elastomer composition is influenced by, for example, the amounts of the components (A) to (F) and additives added in the thermoplastic elastomer composition, and the melt-kneading conditions in preparing the thermoplastic elastomer composition. Therefore, it is preferred to prepare a composition so that the above-described phase form may be formed by making adjustment with respect to the above-mentioned items.

As a method for producing the thermoplastic elastomer composition of the present invention, a method comprising a first kneading step of melt-kneading the components (B) and (C), thereby producing a resin composition precursor, and a second kneading step of melt-kneading the resin composition precursor and the components (A), (D), and (F) in the presence of the component (E) is preferred from the viewpoint of the tensile characteristics of the thermoplastic elastomer composition.

The thermoplastic elastomer composition of the present invention is shaped into various articles by extrusion forming, calendering, and injection molding using an apparatus usually used for thermoplastic resins.

The thermoplastic elastomer compositions of the present invention are used for various applications, such as automotive interior and exterior parts, e.g. an instrument panel, a door trim, a console box, a ceiling sheet, a steering pad, a molding, and a weather strip; various industrial parts; and various building materials.

EXAMPLES

The present invention is hereafter further explained on the basis of Examples, but the invention is not limited to the Examples.

Methods for measuring physical properties (1) Hardness

In accordance with JIS K6253, A hardness was measured.

(2) Tensile Test

In accordance with JIS K6251, using a JIS No. 3 dumbbell, tensile strength at break and tensile elongation at break were measured at a tensile speed of 200 mm/min.

(3) Method for Measuring Average Particle Diameter

As to the particle diameter of each particle, the area S of each particle was measured and then $(4S/\pi)^{0.5}$ was defined to be the particle diameter of each particle. For each of component (A) and component (B), the average value of 100 particles was defined as the average particle diameter of each component.

Materials used in the Examples are as follows.

Ethylene-α-olefin-based copolymer rubber (A1) Oil extended rubber prepared by adding (F1) 100 parts by weight of paraffinic mineral oil to 100 parts by weight of ethylene-propylene-5-ethylidene-2-norbornene copolymer rubber (Mooney viscosity ($ML_{1+4}100°$ C.)=63, content of ethylene units=66 parts by weight, the content of 5-ethylidene-2-norbornene units=4 parts by weight)

Component (B) Non-petroleum source-derived thermoplastic resin (B1) "TERRAMAC TE-2000" produced by Unitika, Ltd. (polylactic acid resin, MFR (230° C., 21.18 N)=40 g/10 min, Mw=120,000, Mw/Mn=1.8)

Component (C) Modified propylene-based copolymer (C1) Modified propylene-based copolymer (MFR (230° C., 21.18N)=120 g/10 min, the amount of maleic-anhydride grafted=0.4 parts by weight)

(C2) Modified propylene-based copolymer (MFR (230° C., 21.18N)=42 g/10 min, the amount of maleic-anhydride grafted=0.17 parts by weight)

(C3) Modified propylene-based copolymer (MFR (230° C., 21.18N)=9.0 g/10 min, the amount of glycidyl methacrylate grafted=1.09 parts by weight)

(C4) Modified propylene-based copolymer (MFR (230° C., 21.18N)=10 g/10 min, the amount of glycidyl methacrylate grafted=0.55 parts by weight)

(C5) Modified propylene-based copolymer (MFR (230° C., 21.18N)=0.59 g/10 min, the amount of acrylonitrile-styrene resin (AS resin) grafted=40 parts by weight)

Component (D) Propylene-based polymer (D1) Propylene homopolymer (MFR (230° C., 21.18 N)=0.40 g/10 min)

(D2) Propylene homopolymer (MFR (230° C., 21.18 N)=100 g/10 min)

Component (E) Crosslinking agent (E1) Commercial name "APO-40S" produced by Kayaku Akzo Corporation (2,5-dimethyl-2,5-di-(tert-butylperoxy)hexane diluted with silicon dioxide in a concentration of 40%)

Crosslinking aid (trimethylolpropane trimethacrylate (commercial name "Hi-Cross M-P" produced by Seiko Chemical Co., Ltd.))

Antioxidant (phenolic antioxidant (commercial name: IRGANOX 1010 produced by Ciba Japan K.K.))

In the following, melt-kneading and dynamic crosslinking were performed using a 100-cc Labo Plastomill (manufactured by Toyo Seiki Seisaku-sho, Ltd.) under conditions including a rotor temperature of 190±10° C. and a revolution speed of 80 rpm.

Example 1

Production of Thermoplastic Elastomer Composition

A thermoplastic elastomer composition was produced by melt-kneading an ethylene-α-olefin-based copolymer rubber (A1/F1), a non-petroleum source-derived thermoplastic resin (B1), a modified propylene-based copolymer (C1), a propylene-based polymer (D1), 0.3 parts by weight of a crosslinking aid, and 0.1 parts by weight of an antioxidant in the presence of a crosslinking agent (E1). Results are shown in Table 1.

Example 2

Production of Thermoplastic Elastomer Composition

A resin composition precursor was produced by melt-kneading a non-petroleum source-derived thermoplastic resin (B1), a modified propylene-based copolymer (C1), and 0.1 parts by weight of an antioxidant. Then, a thermoplastic elastomer composition was produced by melt-kneading the resin composition precursor, an ethylene-α-olefin-based copolymer rubber (A1/F1), a propylene-based polymer (D1), and 0.3 parts by weight of crosslinking aid in the presence of a crosslinking agent (E1). Results are shown in Table 1.

Example 3

Production of Thermoplastic Elastomer Composition

Operations were carried out under the same conditions as the production conditions of the thermoplastic elastomer composition of Example 2 except for using a modified propylene-based copolymer (C2) instead of the modified propylene-based copolymer (C1). Results are shown in Table 1.

Example 4

Production of Propylene-Based Copolymer (C3) Having a Reactive Functional Group Capable of Reacting with Component (B)

One hundred parts by weight of a propylene homopolymer (MFR=0.4 g/10 min), 2 parts by weight of glycidyl methacrylate, 0.38 parts by weight of a radical generator "Perkadox 14/40C" produced by Kayaku Akzo Corp., 0.56 parts by weight of a radical generator "Perkadox 24FL" produced by Kayaku Akzo Corp., and 2 parts by weight of styrene monomer were mixed at once, and then a modified propylene-based polymer (C3) in which an α,β-unsaturated glycidyl ester had been grafted was produced by using a 50 mmϕ twin screw kneading extruder (TEM50 manufactured by Toshiba Machine Co., Ltd.) whose cylinder temperature was set at 180° C. in the upstream region, at 200° C. in the middle region, and at 260° C. in the downstream region, at an extrusion rate of 50 kg/hr and a screw rotation rate of 200 rpm. The amount of glycidyl methacrylate grafted was 1.09 parts by weight where the overall amount of the modified propylene-based copolymer (C3) is considered to be 100 parts by weight and the MFR (230° C.) of the copolymer (C3) was 9 g/10 min.

(Production of Thermoplastic Elastomer Composition)

Operations were carried out under the same conditions as the production conditions of the thermoplastic elastomer composition of Example 2 except for using a modified propylene-based copolymer (C3) instead of the modified propylene-based copolymer (C1). Results are shown in Table 1.

Example 5

Production of Propylene-Based Copolymer (C4) Having a Reactive Functional Group Capable of Reacting with Component (B)

One hundred parts by weight of a propylene homopolymer (MFR=0.4 g/10 min), 2 parts by weight of glycidyl methacrylate, 0.38 parts by weight of a radical generator "Perkadox 14/40C" produced by Kayaku Akzo Corp., 0.56 parts by weight of a radical generator "Perkadox 24FL" produced by Kayaku Akzo Corp., and 2 parts by weight of styrene monomer were mixed at once, and then a modified propylene-based polymer (C4) in which an α,β-unsaturated glycidyl ester had been grafted was produced by using a 50 mmϕ twin screw kneading extruder (TEM50 manufactured by Toshiba Machine Co., Ltd.) whose cylinder temperature was set at 180° C. in the upstream region, at 220° C. in the middle region, and at 260° C. in the downstream region, at an extrusion rate of 50 kg/hr and a screw rotation rate of 200 rpm. The amount of glycidyl methacrylate grafted was 0.55 parts by weight where the overall amount of the modified propylene-based copolymer (C4) is considered to be 100 parts by weight and the MFR (230° C.) of the copolymer (C4) was 10 g/10 min.

(Production of Thermoplastic Elastomer Composition)

Operations were carried out under the same conditions as the production conditions of the thermoplastic elastomer composition of Example 2 except for using a modified propylene-based copolymer (C4) instead of the modified propylene-based copolymer (C1). Results are shown in Table 1.

Example 6

Operations were carried out under the same conditions as the production conditions of the thermoplastic elastomer composition of Example 2 except for using a modified propylene-based copolymer (C5) instead of the modified propylene-based copolymer (C1). Results are shown in Table 1.

Comparative Example 1

Production of Thermoplastic Elastomer Composition

A thermoplastic elastomer composition precursor was produced by melt-kneading an ethylene-α-olefin-based copolymer rubber (A1/F1), a propylene-based polymer (D2), 0.1 parts by weight of an antioxidant, and 0.3 parts by weight of a crosslinking aid in the presence of a crosslinking agent (E1). Then, a thermoplastic elastomer composition was produced by melt-kneading the thermoplastic elastomer composition precursor and a non-petroleum source-derived thermoplastic resin (B1). Results are shown in Table 1.

Example 7

Production of Thermoplastic Elastomer Composition

Operations were carried out under the same conditions as the production conditions of the thermoplastic elastomer composition of Example 4 except for changing the amount of the ethylene-α-olefin-based copolymer rubber (A1/F1), the non-petroleum source-derived thermoplastic resin (B1), the modified propylene-based copolymer (C3), and the propylene-based polymer (D1) added. Results are shown in Table 2.

Comparative Example 2

Production of Thermoplastic Elastomer Composition

A thermoplastic elastomer precursor was produced by melt-kneading an ethylene-α-olefin-based copolymer rubber (A1/F1), a propylene-based polymer (D1), 0.1 parts by weight of an antioxidant, and 0.4 parts by weight of trimethylolpropane trimethacrylate in the presence of a crosslinking agent (E1). Then, a thermoplastic elastomer composition was produced by melt-kneading the thermoplastic elastomer precursor and a non-petroleum source-derived thermoplastic resin (B1). Results are shown in Table 2.

TABLE 2

| | Example 7 | Comparative Example 2 |
|---|---|---|
| A1 | 29.5 | 29.5 |
| B1 | 25 | 25 |
| C3 | 10 | — |
| D1 | 6 | 16 |
| E1 | 0.8 | 0.8 |
| F1 | 29.5 | 29.5 |
| Hardness | 91 | 89 |
| Tensile test | | |
| Strength at break (MPa) | 6.6 | 3.1 |
| Elongation at break (%) | 220 | 360 |
| Particle diameter of component (A) (μm) | 1.1 | 1.2 |
| Particle diameter of component (B) (μm) | 5 | >20 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A thermoplastic elastomer composition obtained by melt-kneading 10 to 90 parts by weight of an ethylene-a-olefin based copolymer rubber (A), 1 to 50 parts by weight of a non-petroleum source-derived thermoplastic resin (B), 1 to 50 parts by weight of a modified propylene-based copolymer (C), 1 to 50 parts by weight of a propylene-based polymer (D), 0.001 to 5 parts by weight of a crosslinking agent (E), and 0 to 50 parts by weight of a mineral oil-based softening agent (F), wherein the amounts of the components (A), (B), (C), (D), and (F) added are amounts calculated where the combined amount of the components (A), (B), (C), (D), and (F) added is considered to be 100 parts by weight, and the amount of the component (E) added is an amount calculated where the combined amount of the components (A), (B), (C), (D), and (F) added is considered to be 100 parts by weight.

2. The thermoplastic elastomer composition according to claim 1, wherein in a morphology of the thermoplastic elastomer composition observed with a transmission electron microscope, the component (C) and the component (D) form

TABLE 1

| | Example 1 | Example 2 | Example 3 | Example 4 | Example 5 | Example 6 | Comparative Example 1 |
|---|---|---|---|---|---|---|---|
| A1 | 33.5 | 33.5 | 33.5 | 33.5 | 33.5 | 33.5 | 33.5 |
| B1 | 10 | 10 | 10 | 10 | 10 | 10 | 10 |
| C1 | 10 | 10 | | | | | |
| C2 | | | 10 | | | | |
| C3 | | | | 10 | | | |
| C4 | | | | | 10 | | |
| C5 | | | | | | 10 | |
| D1 | 13 | 13 | 13 | 13 | 13 | 13 | |
| D2 | | | | | | | 23 |
| E1 | 0.8 | 0.8 | 0.8 | 0.8 | 0.8 | 0.8 | 0.8 |
| F1 | 33.5 | 33.5 | 33.5 | 33.5 | 33.5 | 33.5 | 33.5 |
| Hardness | 85 | 84 | 85 | 87 | 87 | 83 | 91 |
| Tensile test | | | | | | | |
| Strength at break (MPa) | 7.1 | 7.3 | 5.3 | 8.5 | 7.5 | 8.7 | 2.7 |
| Elongation at break (%) | 590 | 640 | 580 | 560 | 480 | 700 | 50 |
| Particle diameter of component (A) (μm) | 1.5 | — | — | 1.6 | 1.5 | — | 1.3 |
| Particle diameter of component (B) (μm) | 2.2 | — | — | 0.8 | 1.2 | — | >20 | a continuous phase, and the component (A) and the component (B) are dispersed in the continuous phase.

3. The thermoplastic elastomer composition according to claim 1, wherein the component (C) is a modified propylene-based copolymer having a reactive functional group capable of reacting with the component (B).

4. The thermoplastic elastomer composition according to claim 3, wherein the modified propylene-based copolymer (C) comprises one or more polymers selected from the group consisting of a modified propylene-based polymer (C-1) comprising constitutional units derived from an unsaturated carboxylic acid and/or constitutional units derived from an unsaturated carboxylic acid derivative and a modified propylene-based polymer (C-2) comprising constitutional units derived from an $\alpha,\beta$-unsaturated glycidyl ester and/or constitutional units derived from an $\alpha,\beta$-unsaturated glycidyl ether.

* * * * *